United States Patent [19]

Sugita et al.

[11] 4,399,013
[45] Aug. 16, 1983

[54] METHOD OF PRODUCING A MAGNETIC RECORDING MEDIUM

[75] Inventors: Ryuji Sugita, Hirakata; Toshiaki Kunieda, Minoo, both of Japan

[73] Assignee: Matsushita Electric Industrial Co., Ltd., Japan

[21] Appl. No.: 240,369

[22] Filed: Mar. 4, 1981

[30] Foreign Application Priority Data

Mar. 7, 1980 [JP] Japan ................................ 55-29616
Apr. 14, 1980 [JP] Japan ................................ 55-49374
Jun. 11, 1980 [JP] Japan ................................ 55-79548

[51] Int. Cl.³ .......................................... C23C 15/00
[52] U.S. Cl. ............................ 204/192 N; 427/132
[58] Field of Search ............. 427/38, 39, 42, 127–132, 427/48; 428/694, 900; 204/192 N

[56] References Cited

U.S. PATENT DOCUMENTS 3,775,179 11/1973 Clow .................................. 117/240
4,091,138 5/1978 Takagi et al. ........................ 427/38
4,220,117 9/1980 Shinohara ........................... 427/132
4,277,809 7/1981 Fisher et al. ........................ 427/131

*Primary Examiner*—Bernard D. Pianalto
*Attorney, Agent, or Firm*—Wenderoth, Lind & Ponack

[57] ABSTRACT

There is provided a method of producing a magnetic recording medium having a magnetic layer composed mostly of Co and Cr. The method is characterized by vacuum vapor deposition of components which are to form the magnetic layer under conditions where atoms of the evaporated components are in the discharge state.

5 Claims, 18 Drawing Figures

METHOD OF PRODUCING A MAGNETIC RECORDING MEDIUM

BACKGROUND OF THE INVENTION

This invention relates to a method of producing magnetic recording media, and more particularly to a method suitable for the deposition of a magnetic material with its direction of easy magnetization oriented in a direction substantially perpendicular to the film plane.

Referring to FIG. 1 which shows a conventional magnetic recording system, a recording medium 1 consists of a base film 2 and a magnetic layer 3 formed thereon and the direction of easy magnetization of the magnetic layer 3 is horizontal with respect to the film plane (as indicated by the arrow-marks). Accordingly, a recording head 4 associated therewith is constructed and disposed in such a manner that, in recording, it applies a magnetic field with the direction of easy magnetization horizontal with respect to the film plane.

Since the direction of residual magnetization is horizontal to the film plane in the above system, the demagnetizing field in the recording medium is increased as the recording signal is of short wavelength, with the result that the reproduction output is considerably reduced.

In contrast, the short wavelength recording characteristics are remarkably improved in a recording system where the residual magnetization is perpendicular with respect to the film plane of the medium. Such a system will hereinafter after be referred to as a perpendicular recording system. Referring to FIG. 2 which illustrates a perpendicular recording system in schematic representation, a recording medium 5 (briefly, a perpendicular recording medium) consists of a base film 2 and a magnetic layer 6 which is a magnetic thin film (briefly, a perpendicular magnetizing film) having a direction of easy magnetization. perpendicular (indicated by arrow-marks) to the film plane. A recording head 7, used in association with said perpendicular recording medium, is a vertical-type head comprising a ferromagnetic thin film 8 and an excitation coil 9, which applies a magnetic field perpendicular to the film plane of the magnetic layer for recording.

In the system described above, where the residual magnetization on the recording is perpendicular to the film plane of the medium, the demagnetizing field of the medium decreases as the signal becomes shorter in wavelength so that a desirable reproduction output is ensured.

The perpendicular magnetizing layer so far known is a metallic thin film composed of cobalt and chromium as predominant components as formed by the sputtering technique, and having a high coercive force of approximately 1 KOe.

The crystal conformation of the sputtered film based on Co and Cr is a hexagonal closest packing lattice structure when the proportion of Cr is not over about 30 weight percent and in this crystal system, the C axes of unit cells can be oriented in a direction perpendicular to the film plane and the saturation magnetization can be decreased until the anisotropic magnetic field in the perpendicular direction becomes greater than the demagnetizing field, thus enabling a perpendicular magnetizing layer to be matelialied. According to the results of deposition trials, the amount of Cr that yields a perpendicular magnetizing Co-Cr film is in the range of about 13 to 28 weight percent.

However, the sputtering process is slow in the rate of formation of a magnetic layer and does not lend itself to the production of perpendicular magnetizing film at high speed and low cost.

On the other hand, since the base film for a magnetic recording medium is usually a plastic film, such as polyethylene terephthalate film, which is only poorly resistant to heat, the formation of the magnetic film thereon must be carried out under temperature conditions which do not thermally degrade, deform or otherwise impair the base film material.

There has thus been demanded a method which permits production of a perpendicular magnetizing film having satisfactory characteristics at a low temperature which would not adversely affect the base material.

SUMMARY OF THE INVENTION

It is a primary object of this invention to provide a method by which a perpendicular magnetic recording medium can be produced at a high speed and with high productivity.

It is a further object of this invention to provide a method of producing a perpendicular magnetic recording medium, which lends itself to the formation of a perpendicular magnetizing film without entailing a thermal degradation of the medium.

This invention is characterized in that the formation of a magnetic layer predominantly composed of cobalt and chromium is accomplished by vacuum vapor deposition of the components under conditions where atoms of the evaporated components are in the discharge state.

BRIEF DESCRIPTION OF THE DRAWINGS

(FIG. 3) and of 500° C. (FIG. 4);

DETAILED DESCRIPTION OF THE INVENTION

Figure 1:
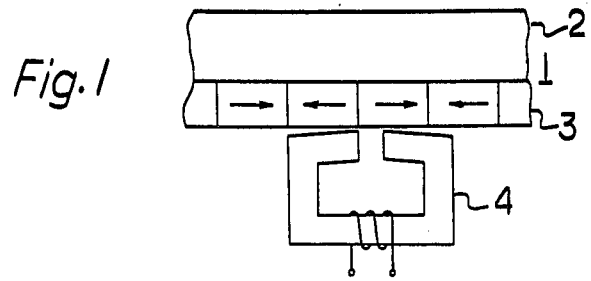
FIG. 1 is a sectional elevation view of a magnetic tape and a recording head for an explanation of the conventional ordinary magnetic recording system.
Figure 2:
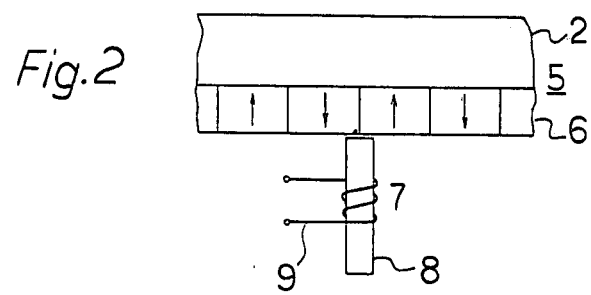
FIG. 2 is a sectional elevation view of a magnetic tape and a recording head for an explanation of the perpendicular magnetic recording system.
Figure 3:
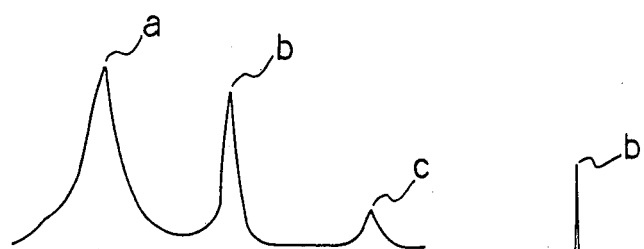
FIGS. 3 and 4 show the X-ray diffraction patterns of the Co-Cr thin films obtained by vacuum vapor deposition at the substrate temperatures of 20° C.
Figure 4:
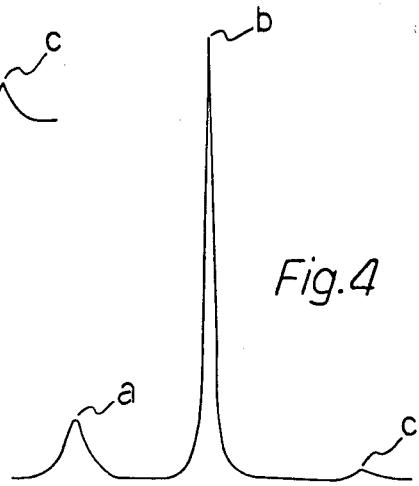

To ensure that a thin film based on cobalt and chromium will be a perpendicular magnetic film, the crystals of magnetic material forming the thin film must assume a hexagonal closest packing lattice structure with C-axes of the unit cells oriented in a direction perpendicular to the film plane. On the other hand, in order to ensure a high speed of film formation, vacuum vapor deposition is a desirable technique. This technique yields a lattice of hexagonal closest packing if the proportion of Cr is $\leq 30$ weight percent but, if the temperature of the base or substrate layer is below 400° C., does not ensure any substantial orientation of C-axes. The X-ray diffraction patterns of Co-Cr thin films obtained by vacuum vapor deposition at the substrate temperatures of 20° C. and 500° C. are shown in FIGS. 3 and 4, respectively. In both figures, a, b and c represent reflections from the (101), (002) and (100) plane of the crystal lattice of hexagonal closest packing. As will be apparent from these data, the Co-Cr film obtained at the substrate temperature of 20° C. (FIG. 3) is substantially random-oriented but in the film obtained at 500° C., the C-axes of unit cells are fairly oriented in a direction perpendicular to the film plane. However, only a limited variety of substrates are resistant to high temperatures around 500° C. and none of organic high polymer materials are capable of withstanding such sense processing conditions.

Now, the dependency of the C-axial orientation of Co-Cr films produced by vacuum vapor deposition on the temperature of the substrate film suggests that in order to promote a C-axial orientation, the mobility of atoms of the evaporated metal must be large on the substrate surface. This presumption is consistent with the hypothesis that the sputtering technique yields a better orientation of C-axes because the bombarded atoms have a kinetic energy about 10 times as large as the atoms liberated by vacuum vapor evaporation and, therefore, a greater mobility of atoms on the substrate surface.

In order to ensure a great mobility of activated atoms on a substrate surface in the vacuum vapor deposition process, atoms of the evaporated metal should be the in discharge state. When vacuum vapor deposition was carried out under such conditions, it was found that a satisfactory Co-Cr film having a direction of easy magnetization perpendicular to the film plane could be successfully produced.

Production of a perpendicular magnetic film by creating such a discharge state of activated atoms can be accomplished by several methods but the following three methods have been found to be particularly advantageous.

A first of such methods involves the use of an evaporation source of electron-beam heating type in association with an electron gun having a sufficiently large output. In this method, a very stable discharge state can be realized by using an evaporation source completely insulated from the environment except the action of the electron gun.

A second method employs an evaporation source associated with an electron gun as does said first method but, additionally, an electric potential is applied between the substrate or a vicinity of the substrate and the evaporation source so as to establish a positive electric potential at the substrate or vicinity thereof.

In a third method, a high frequency electrode is disposed between the substrate and evaporation source and a high frequency voltage is applied to the electrode, while a positive potential is maintained at the substrate or in the vicinity of the substrate with respect to the evaporation source.

The above methods will now be described in further detail.

The first method will now be described with reference to FIGS. 5 to 11. This method is carried out using a device like the one illustrated in FIG. 5. An evaporation souce 10 is a water-cooled copper hearth 11 holding a material 12 which is evaporated. In the vicinity of the hearth 11 is located an electron gun 13 which emits an electron beam towards the material 12 to heat and evaporate it. A substrate film 15 is located overhead of the evaporation source 10 so that a magnetic film is produced on said substrate 15. The above-mentioned elements and materials are accomodated in a vacuum chamber 16.

Figure 6:
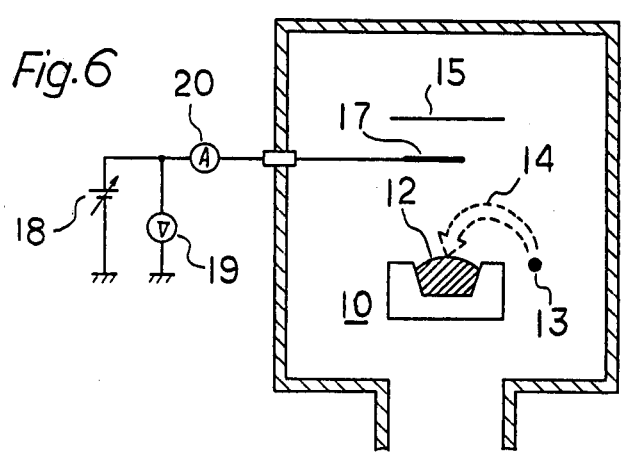
FIG. 6 is a diagrammatic view showing a method for detecting the operational condition of the device depicted in FIG. 5.
Figure 7:
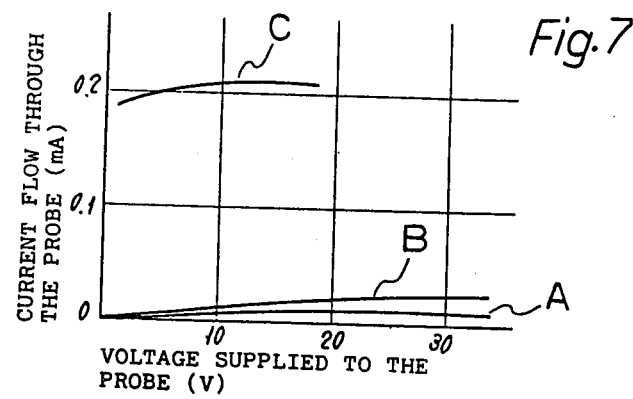
FIGS. 7 and 8 are graphs showing the operational condition of the device of FIG. 5 as measured by the method illustrated in FIG. 6.
Figure 8:
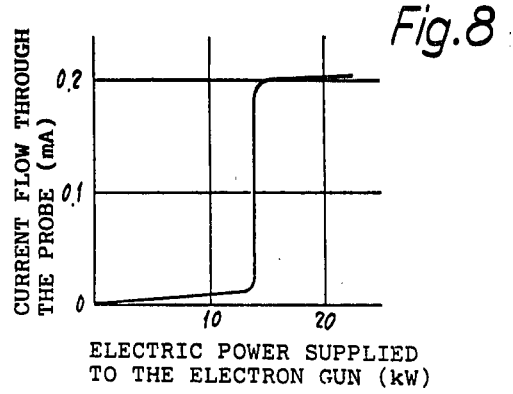

In the above arrangement, as the power supply to the electron gun 13 is increased to a sufficient extent, atoms of evaporated material are brought onto a discharge state. Whether these atoms are in the discharge state or not can be checked by disposing a probe 17 between the substrate 15 and the evaporation source 10, applying a voltage to the probe and measuring the current that flows in the probe as schematically illustrated in FIG. 6. FIGS. 7 and 8 show the results of measurements made with a variable DC power source 18 as a voltage source, a DC voltmeter 19 and a DC ammeter 20. FIG. 7 is a graph showing the relation of the voltage applied to the probe 17 to the current that flows. The curves A, B and C represent the cases in which the power supplied to the electron gun was 5 kW, 10 kW and 16 kW, respectively. FIG. 8 is a graph showing the relation of the power supplied to the electron gun 13 to the current that flows in the probe 17, the voltage applied to the probe being 5 V. The degree of vacuum was $5 \times 10^{-5}$ Torr, and the power to gun was regulated by varying the current while the voltage is kept constant at 10 kV. It will be seen from these graphs that when the power supplied to the electron gun exceeds 14 kW, there occurs a sudden increase of current indicating that atoms of evaporated material have been brought into a discharge state.

It should be noted that the conditions conducive to a discharge state of atoms vary according to such factors as the degree of vacuum, structure of the evaporation source, etc.

Figure 5:
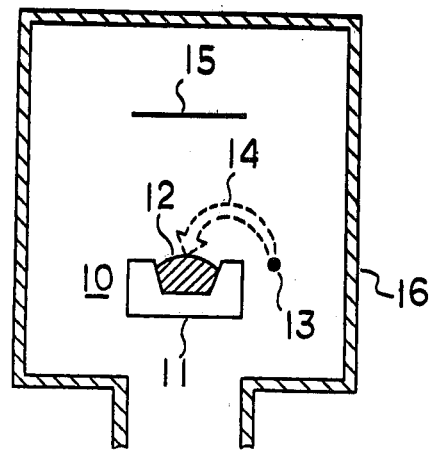
FIG. 5 is a schematic sectional view showing the vacuum vapor deposition device used in an embodiment of this invention.
Figure 9:
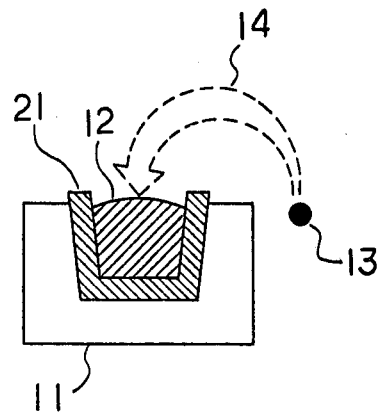
FIG. 9 is a sectional view showing an improved evaporation source.

While the discharge state obtainable with the device of FIG. 5 is not as stable as desired, a more stabilized discharge state can be established by adopting an evaporation source structure like the one shown in FIG. 9. Referring to FIG. 9, a crucible 21 made of a heat-resistant insulation material such as magnesia or zirconia is positioned in a water-cooled copper hearth 11 and the material to be evaporated is held in the crucible 21. In this arrangement, the material to be evaporated is shielded from the environment except for the action of the electron gun 13. With this particular evaporation source, a stable discharge state could be established even at a low power supply of 3 kW under otherwise the same conditions as those mentioned with reference to the device of FIG. 5.

Figure 10:
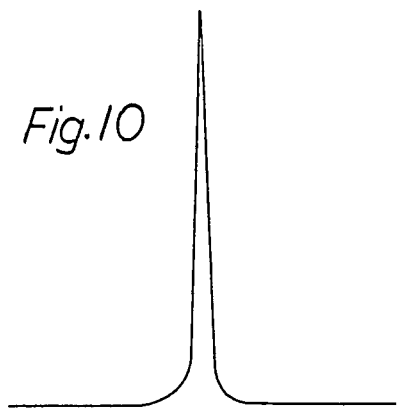
FIGS. 10 and 11 are diagrammatic views showing the X-ray diffraction pattern and hysteresis curve of the magnetic recording medium produced in accordance with an embodiment of this invention.
Figure 11:
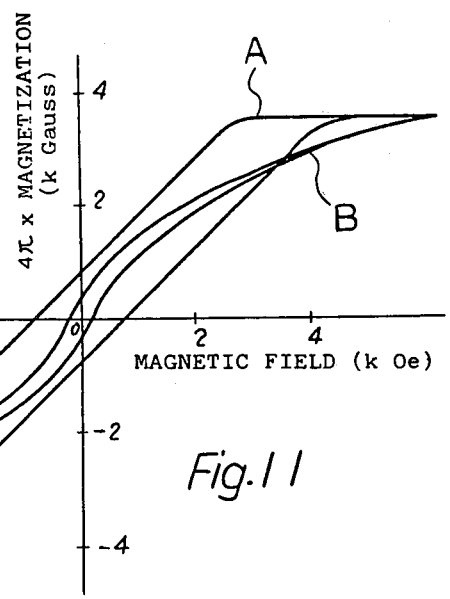

FIGS. 10 and 11 show the characteristics of a Co-Cr film produced by means of the evaporation source of FIG. 9 under conditions ensuring a discharge state of atoms. The degree of vacuum was $5\times10^{-5}$ Torr, the substrate was a heat-resistant high polymer base sheet and the temperature of the substrate was atmospheric temperature. The distance from the substrate to the evaporation source was 20 cm and the power supplied to the electron gun was 3.5 kW (10 hV, 0.35 A). Under the above conditions, the rate of formation of the thin film was about 2000 Å/second. The composition of the film was that it contained 18 weight percent of Cr.

The peak in the X-ray diffraction pattern of FIG. 10 represents reflections from the (002) plane, indicating that C-axes are oriented perpendicularly with respect to the film plane.

In FIG. 11, Curve A is a hysteresis curve which was obtained with a magnetic field applied in a direction perpendicular to the plane of the Co-Cr film and B is a hysteresis curve in the planar direction of the film. As to Curve A, no correction was made for a demagnetizing field. These hysteresis curves show that the direction of easy magnetization coincides with a direction perpendicular to the film plane.

In contrast, when the power supply to the electron gun was set at 2.5 kW (10 kV, 0.25 A) and a vacuum deposition process was carried out under otherwise the same conditions above, which conditions were not conducive to said discharge state of atoms, the resulting Co-Cr film was substantially non-oriented and gave an X-ray pattern like that shown in FIG. 3.

It should be understood that in the case of a binary vacuum deposition process where Co and Cr are evaporated from independent evaporation sources, both of the sources may be associated with electron guns but a perpendicular magnetic film can also be obtained if an electron gun is used for the Co source and a resistance or high frequency heating setup is used for the Cr source provided that the gun for the Co source is supplied with a sufficiently large power to ensure said discharge state of the atoms.

The second method of this invention will now be described in detail with reference to FIGS. 12 to 15.

Figure 12:
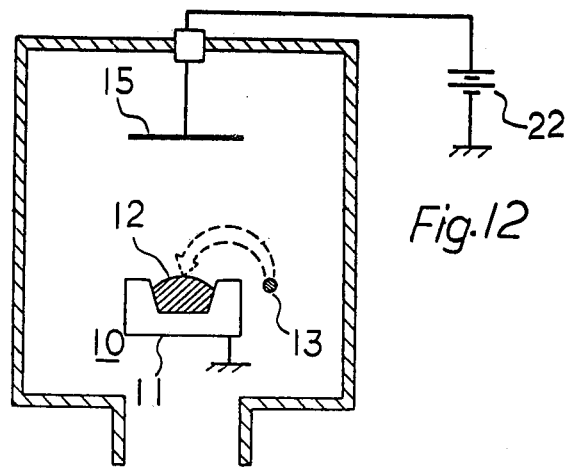
FIG. 12 is a schematic sectional view showing the vacuum vapor deposition device in another embodiment of this invention.
Figure 13:
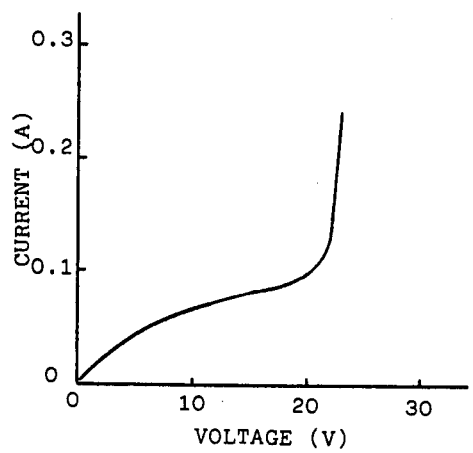
FIG. 13 is a graphic representation showing the relation of the voltage applied to the base film and the current which flows in said base film in the system depicted in FIG. 12.

As shown in FIG. 12, this second method is similar to the first method depicted in FIG. 5 except that a voltage is applied from a DC power source 22 to the substrate 15 so that the substrate will have a positive potential with respect to the evaporation source. The difference between these methods is that whereas in the first method, atoms of the evaporated material are brought into a discharge state by controlling the power supply to the electron gun 13, the second method is distinct in that such atoms are brought into discharge state by controlling the voltage applied to the substrate 15.

Figure 14:
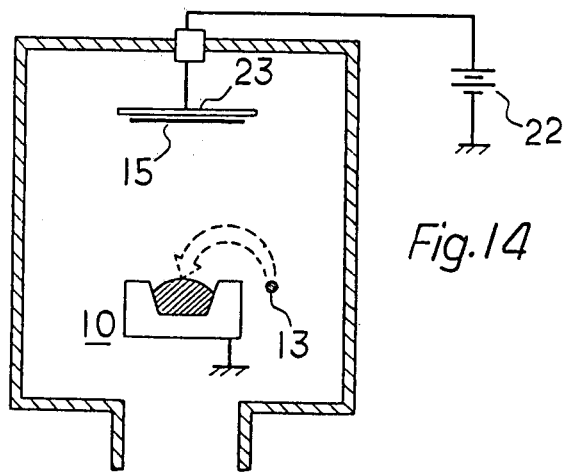
FIGS. 14 and 15 each is a sectional view showing a different embodiment of the device shown in FIG. 12.

FIG. 14 shows the relation of the voltage applied to the substrate with the current that flows in the substrate when the power supply to the electron gun is 2 kW. It is seen that as the voltage is increased to more than 21 V, there occurs a sharp increase of current, indicating that atoms of the evaporated material have been brought into a discharge state. It is, thus, clear that the power supply to the electron gun may be smaller that required for the first method depicted in FIG. 8. The perpendicular Co-Cr film obtained by the second method under the above discharge state had desirable characteristics as shown in FIGS. 10 and 11.

It may be pointed out that if a negative potential is imparted to the substrate with respect to the evaporation source, the process is equivalent to the process known as electrodeposition or DC ion plating. In the resulting film, the C-axes of unit cells are more or less oriented in a direction perpendicular to the film plane but its degree of orientation is not sufficiently high to afford said perpendicular magnetic layer, with the direction of easy magnetization of the layer lying within the film plane.

In the binary vacuum vapor deposition method where Co and Cr are evaporated from independent evaporation sources, the objects of this invention can also be accomplished by using an electron gun heating setup only for the Co source as mentioned in the description of the first method.

Figure 15:
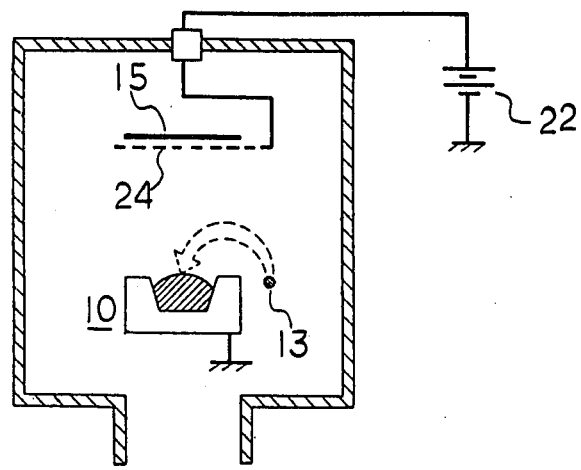

In the second method, the objects of this invention can be equally accomplished by imparting a positive potential to a metal plate 23 located behind the substrate 15 as shown in FIG. 14 or to a metal wire-mesh screen 24 disposed in front of the substrate 15 as shown in FIG. 15.

The third method of this invention will be described hereinbelow with reference to FIGS. 16 to 18.

In a sense, this method is an improvement over the high frequency ion plating process. In the high frequency ion plating process, atoms of evaporated material have a high mobility on the substrate surface but the Co-Cr film produced by the technique is not suited for the perpendicular magnetic layer contemplated by this invention.

Figure 16:
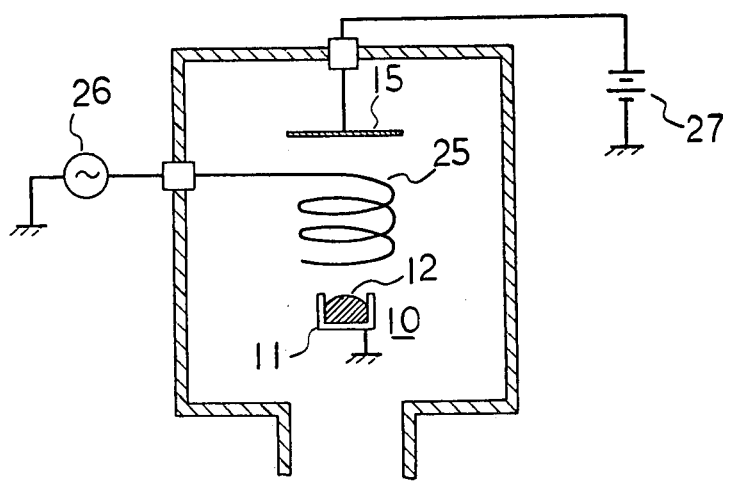
FIG. 16 is a schematic sectional view showing the vacuum vapor deposition device used in a different embodiment of this invention.

The third method of this invention is carried out using the apparatus depicted in FIG. 16, where the evaporation source 10, base plate 15 and vacuum chamber 16 are similar to those described hereinbefore. Additionally, a high frequency electrode 25 is disposed between the evaporation source 10 and the substrate 15, and a high frequency electric field is applied by a high frequency power source 26. From a DC power source 27, a DC voltage is applied to the substrate 15 to establish a positive potential with respect to the evaporation source 15. Except that the substrate 15 has a positive potential with respect to the evaporation source 15, the arrangement is similar to that for ordinary high frequency ion plating. Atoms of evaporated material are ionized or excited by the high frequency electric field applied by the high frequency electrode.

By practicing this method with a substrate temperature of 100° C. or less, there was obtained a Co-Cr film having characteristics similar to those shown in FIGS. 10 and 11. The degree of orientation of C-axes showed a decreasing tendency at substrate temperatures over 100° C.

Figure 17:
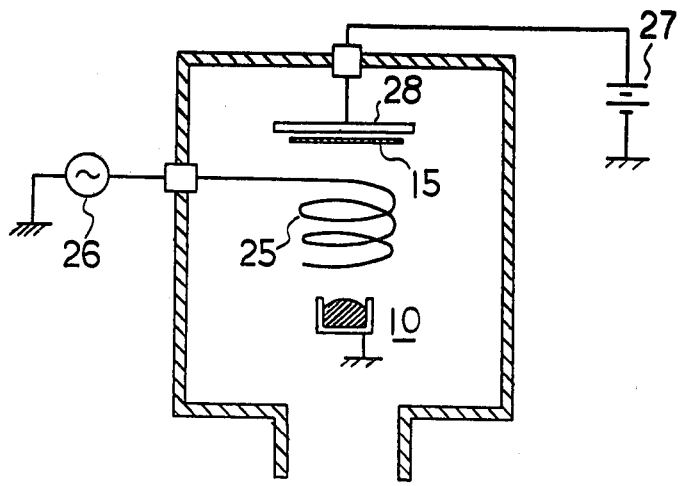
FIGS. 17 and 18 each is a sectional view showing another embodiment of the device depicted in FIG. 16.
Figure 18:
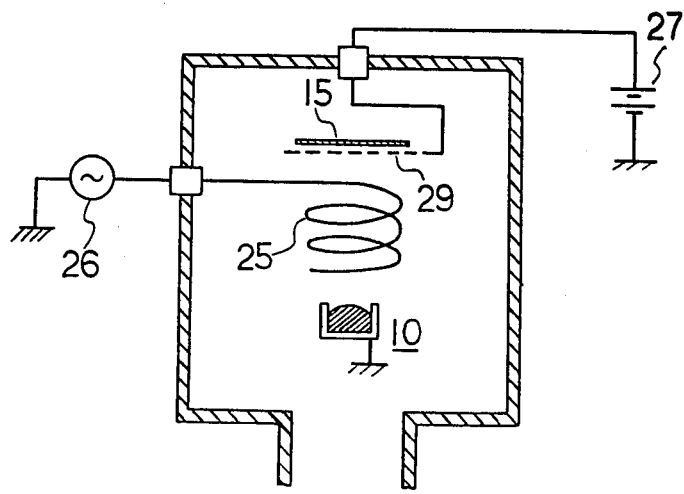

In this method, similar results were obtained when, instead of applying a voltage directly to the substrate 15, a voltage is applied to a metal electrode 28 disposed behind the substrate 15 as illustrated in FIG. 17 or a metal wire-mesh screen 29 disposed in front of the substrate 15.

By the foregoing methods of this invention, a perpendicular magnetic film can be produced at a very high rate of several thousand Å per second which is remarkably faster than several Å per second in the case of sputtering. Furthermore, because the temperature of the substrate may by as low as room temperature, the methods can be applied to the production of recording media based on high polymer materials widely used in the conventional magnetic tapes.

What is claimed is:

1. A method of producing a perpendicular magnetic recording medium, including a step of forming a magnetic layer as a thin film composed predominantly of cobalt and chromium on a substrate, wherein said thin film is formed by vacuum vapor deposition under conditions which comprise:

producing a vapor composed predominantly of cobalt and chromium from an evaporation source, causing electrons to be produced in proximity to said evaporation source and causing these electrons to reach the substrate surface in an amount sufficient to cause the atoms of vaporized film-forming material at or near the substrate to be in the discharge state.

2. The method of producing a magnetic recording medium as claimed in claim 1, wherein at least one evaporation source for at least one component of said film-forming material is an evaporation source associated with an electron gun and the electric power supplied to said electron gun during the formation of said magnetic layer is sufficiently large to cause the atoms of vaporized material to be in the discharge state.

3. The method for producing a magnetic recording medium as claim in claim 2, wherein an evaporation source is used which is insulated from the environment except for action of said associated electron gun.

4. The method of producing a magnetic recording medium as claimed in claim 1, wherein at least one evaporation source for at least one component of said film-forming material is an evaporation source associated with an electron gun and said vacuum vapor deposition is carried out with said substrate or the vicinity of said substrate being maintained at a positive potential with respect to said evaporation source.

5. The method of producing a magnetic recording medium as claimed in claim 1, wherein said vacuum vapor deposition is carried out by applying a high frequency voltage to a high frequency electrode positioned between said substrate and an evaporation source for film-forming material to thereby ionize atoms of said film-forming material, with said substrate or the vicinity of said substrate being maintained at a positive potential with respect to said evaporation source.

* * * * *